United States Patent

Fee

[15] 3,639,021
[45] Feb. 1, 1972

[54] CLOSURE FOR FLY TACKLE FISHING BOX

[72] Inventor: Willard E. Fee, One W. Santa Inez Ave., San Mateo, Calif. 94402

[22] Filed: June 8, 1970

[21] Appl. No.: 44,286

[52] U.S. Cl. .......................... 312/234.1, 206/44.11, 220/23
[51] Int. Cl. .................................. A47b 81/00, B42f 21/00
[58] Field of Search ................... 312/234.1; 206/1, 38, 78 B, 206/44.11; 2/51; 220/23

[56] References Cited

UNITED STATES PATENTS

| | | | |
|---|---|---|---|
| 417,979 | 12/1889 | Borcherdt | 220/23 X |
| 2,280,935 | 4/1942 | Stevens | 206/44.11 |
| 2,290,681 | 7/1942 | Fussner | 206/44.11 |
| 2,541,890 | 2/1951 | Schaperkotter et al. | 220/23 X |
| 2,960,254 | 11/1960 | Kiba | 220/23 |
| 3,346,313 | 10/1967 | Fee | 312/234.1 |

*Primary Examiner*—Paul H. Gilliam
*Attorney*—Townsend and Townsend

[57] ABSTRACT

A fishing tackle box having a pan-shaped compartmented body open at the top, and separate openable covers for each compartment. Said covers have a shelf for receiving a name plate, and a well for receiving a fishing tackle fly. Seated thereover is a removable transparent window. Pins mounted on the covers engage bearings on the compartment walls. A depression on the front edge of the covers receives a horizontal protruding ridge, securing cover closure.

4 Claims, 5 Drawing Figures

CLOSURE FOR FLY TACKLE FISHING BOX

The present invention relates to containers for fish hooks, and more particularly to tackle boxes for fly fishing hooks.

Because of the large assortment of fly hooks available today, it is virtually impossible for anyone to identify the thousands of standard artificial fly patterns and countless local variations now on the market. It is also impossible to remember and recognize the name of each fly pattern that the average fly fisherman may have in his collection.

It is an object of this invention, therefore, to provide a fly storage box having a number of drawers divided into compartments for storing flies of various types. These compartments include covers having indicia means for identifying the types of flies in the compartments.

As such a storage box cannot be conveniently carried by a fisherman, it is a further object of this invention to provide a portable, lightweight fly box divided into compartments. The portable fly box is equipped with covers, like those for the storage box, for identifying the type of flies contained within the compartments.

It is yet another object of this invention to provide compartment covers sized to be interchangeable in the compartments of either the fly storage box or the portable, lightweight fly box.

In my earlier U.S. Pat. No. 3,346,313, issued Oct. 10, 1967, I described an inexpensive compartmented box for carrying wet or dry flies so that neither the hooks nor the delicate structure of the flies were damaged. This box was especially adapted for carrying a large number of flies within a relatively small space so that ready access to the desired fly selection was afforded.

The fishing tackle box described therein had a pan-shaped compartmented body open at the top, and separate hinged covers for the compartments, which carried opposed hinged pins journaled in bushings. A permanent magnet was mounted on the inner surface of one wall of each compartment and a plated steel block was carried by each cover contacting with the magnet to hold the cover closed. The cover was held on the pins by a bushing and a coiled spring mounted in the bushing.

Because the name plate was embedded in the compartment covers, it was necessary to provide as many types of covers as there are types of fly hooks. This required the fisherman to have on hand more covers than compartments, or to purchase a new cover with each new fly hook. Further, the fishing tackle box of my earlier patent was fairly complicated to manufacture, requiring permanent magnets and plated steel blocks to be incorporated into the compartmented body walls and hinged cover tops respectively. Also, bushings had to be provided with coil springs.

It is a further object of this invention to provide a fly tackle fishing box of improved design to afford greater flexibility in use, simplicity in manufacture, and reduced cost.

In accord with the above objects, a modified tackle box is provided having a hinged cover which removably encases a fly hook and name plate. Removable encasement offers the advantage of greater flexibility of use. The user is furnished name plates which may be blank or labeled, and may make up covers to suit his own needs. In this way, when a new fly hook is purchased, it is not necessary to buy a new cover. The user need never purchase more covers than initially required for each storage compartment on hand. Further, by providing blank name plates, the user can prepare his own covers for flies which he has made himself. When the supply of flies stored within a given compartment becomes exhausted, if desired, the fly encased within the cover itself may be removed and used. Hence, the fly hook is not irretrievably sacrificed when preparing the cover.

As another feature of this invention, an improved means has been afforded for hingedly mounting the covers to the fishing tackle box. The covers have hinge pins, said pins being an integrally formed part thereof. The walls of the fishing tackle box compartments include bearings to receive these pins. The bearings have a top opening of a width less than the diameter of the pins and flexible bearing walls for removable engagement. The cover may easily be removed by applying a radially outward force thereto. The pressure exerted by the hinge pins against the bearing opening causes the flexible bearing walls to spread, thereby releasing the pins. Such hinging means offers the advantage of simplicity of manufacture over the fishing tackle boxes of my earlier patent. The requirement for springs is removed. Furthermore, the box and cover may be formed by simple molding. No other steps or parts are required for the hinging mechanism. Such simplicity leads to reduced cost. It further provides a more rugged tackle box as there are no springs to be lost and the integrally formed pins are less likely to be broken.

As yet another feature of this invention, an improved means for securing the covers in a closed position is provided, whereby the covers are held in place by a pressure fit. Opposite the hinged end of the cover there is a tab or flange. Below this flange, on the front end of the cover, is an elongated horizontal abutment. The spacing between the abutment and flange defines a depression sized to receive an elongated horizontal ridge, affixed to the front wall of the compartment. When the cover is closed, the ridge engages the depression to secure the cover in place. Thus the closure means is integrally formed with the tackle box and identifying cover closure. Such feature offers the further advantage of reduced cost due to reduced material requirements and further ease of manufacture. It is not necessary to provide permanent magnets or steel blocks.

Further features and advantages of the present invention will become apparent by reference to the following description and accompanying drawings in which.

Figure 1:
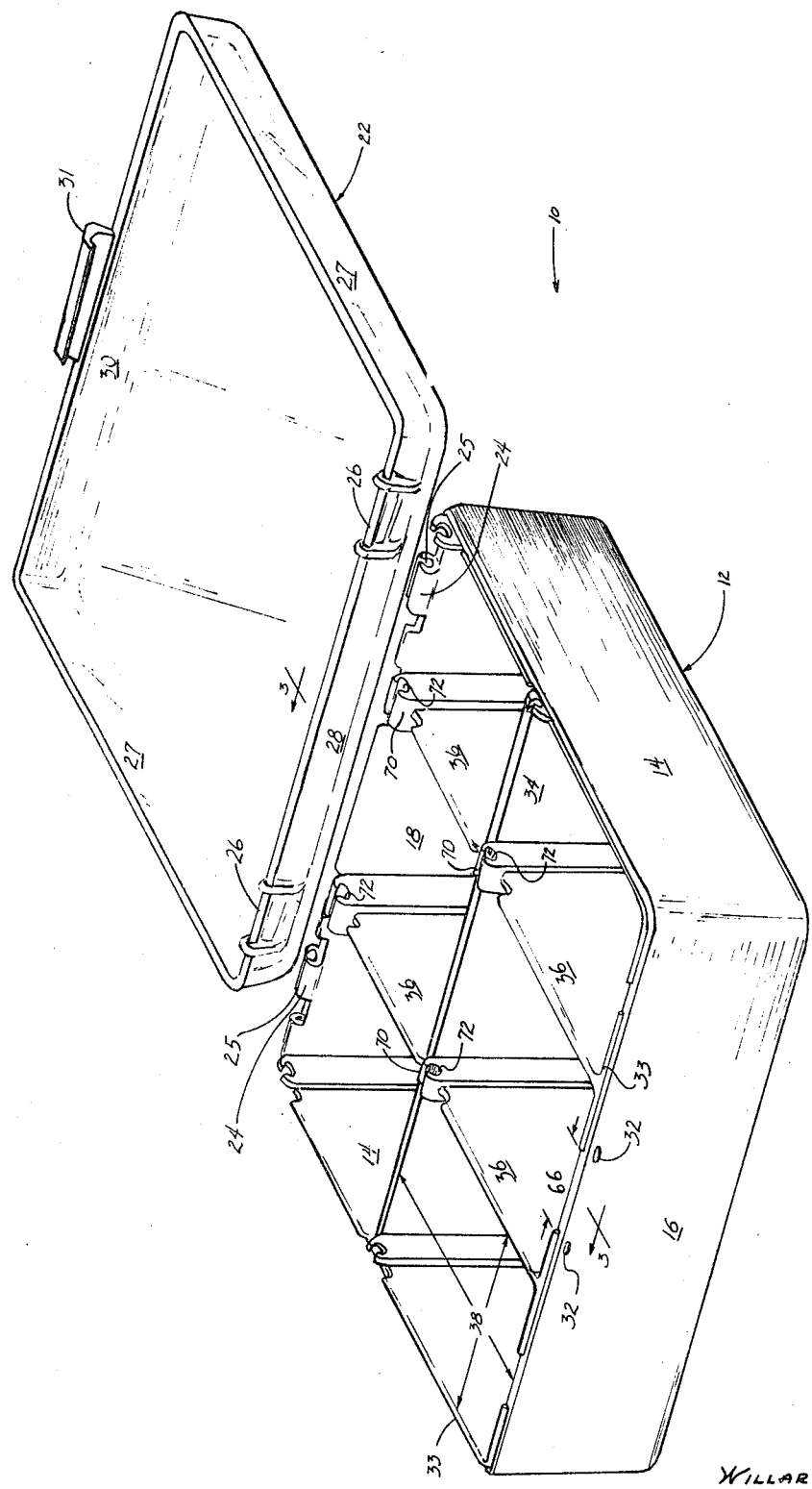
FIG. 1 is an overall perspective view of the fishing tackle box showing the storage compartments and tackle box cover.

Referring more particularly to the drawings, in FIG. 1, a fly box embodying one form of this invention is shown and designated generally as 10. The fly box 10 is substantially rectangular in configuration, comprising a panlike body or housing 12 including end walls 14, 14, sidewalls 16 and 18, as well as bottom 20. The box is formed from a suitable plastic material, and preferably a transparent plastic material, such as acrylonitrile-styrene copolymer.

The box body is opened at the top and is closed by transparent fly box cover 22 hinged to sidewall 18 at the top thereof by hinges 24. These hinges comprise bearings 25, open at one end and sized to receive journals 26 attached to and projecting from cover 22. Alternatively, the fly box cover may be openably mounted on body 12 by means of a "living hinge." Such a hinge is formed from a continuous thin and flexible sheet of plastic which is interconnected between the body 12 and the cover 22, and can be integrally molded therewith.

The body of the fly box cover is inverted boxlike or panlike with end flanges 27, 27, and side flanges 28 and 30. Though not shown, the interior of the body of the cover may be lined with lamb's wool.

Fly box cover 22 includes flange 31 which affords a convenient means for grasping the cover for opening or closing. Protuberances 32 are positioned on box 12 to engage flange 31 when the cover is closed. Peripheral or rim walls 33 serve to guide cover 22 to the closed position and provide secure closure. These walls are formed of the same material as the fly box and have a smaller cross section. They are flush with the inside surface of walls 14 and 16 and fit within walls 27 and 30 when the fly box cover is closed.

The interior of body 12 is divided by wall 34 extending along the center of the interior thereof and by walls 36 extending across the interior of the body into compartments 38, for receiving a plurality of flies 39. If the flies are of sufficiently small dimensions, a pair or more of them may be disposed within a single compartment 38. A single fly is disposed within a single compartment where it is of sufficiently large dimension.

A hinged cover 42 is provided for each compartment 38. The cover comprises a thick, plastic, platelike, essentially rectangular-shaped body 44, which may be transparent, having a leading edge 45, sides 46, top surface 48, wall 51, which diverges downwardly from edge 45, bottom surface 52 parallel to top 48, and tapered rear portion 49. By tapering the rear portion, ease of access to the tabs of the rear covers is facilitated. Rear portion 49 terminates in a semicircular wall 50 which forms an integral part of hinge pins 63.

Figure 2:
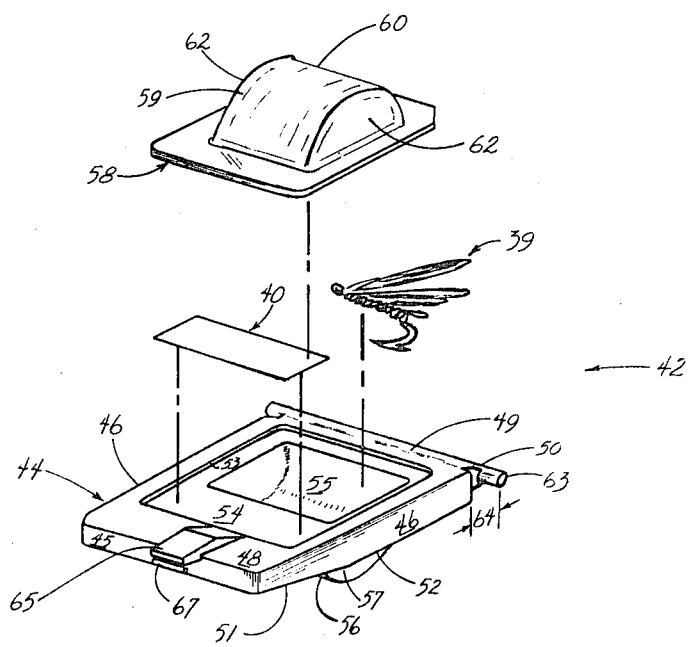
FIG. 2 is an exploded perspective view of a hinged compartment cover.
Figure 3:
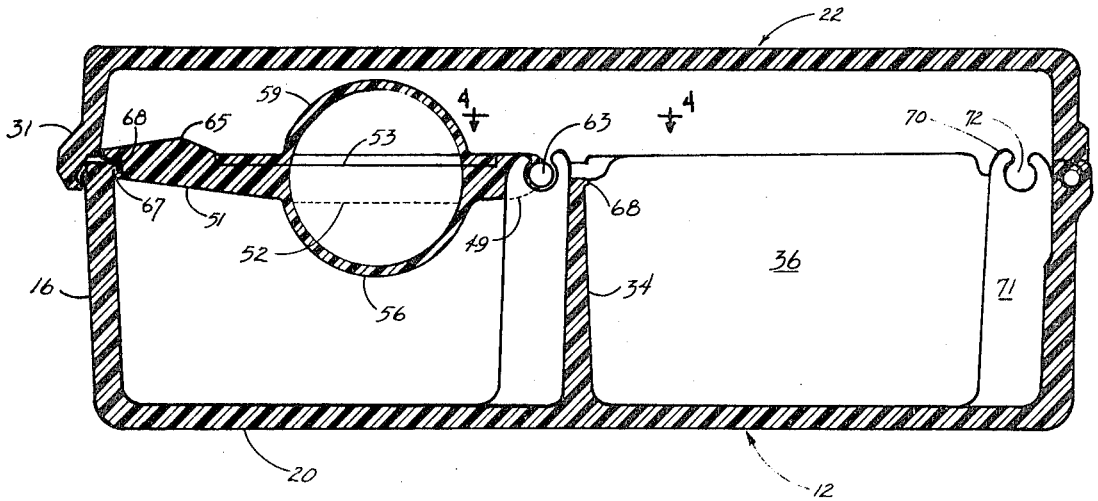
FIG. 3 is a sectional side view of the hinged cover of FIG. 2 taken along line 3—3, the compartment cover in place over a compartment in the fishing tackle box.
Figure 4:
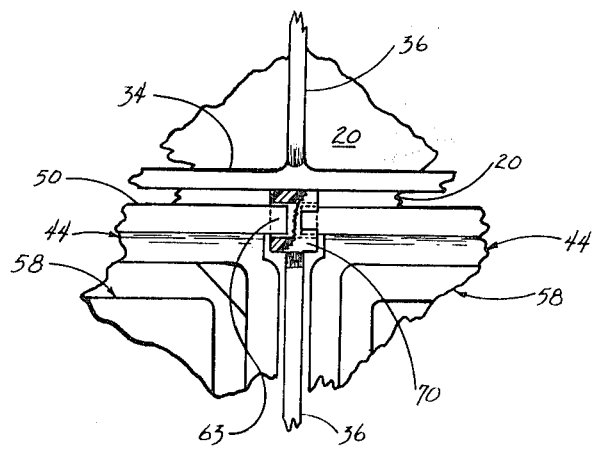
FIG. 4 is a fragmentary top view of the hinge structure shown in FIG. 3 taken along line 4—4.

The top flat portion of cover 42 has a recessed area 53 defining a shelf 54 and a well 55 which extends downwardly from said recessed portion and below the bottom surface 52 of the hinged cover. The well may be cylindrical as shown, having an arcuate wall 56 and semicircular sidewalls 57. The shelf 54 receives name plate 40 and removable transparent window 58 thereupon. The window is sized to fit securely into recessed area 53, and when inserted therewithin, the top flat surface of the window is flush with the top surface 48 of body 44. Window 58 may include a bubble 59, the bubble shown in FIG. 2 having an arcuate wall 60, and semicircular sidewalls 62, which complement well 55 to define a substantially cylindrical compartment to encase fly hooks. The semicircular sidewalls afford a convenient grip for window removal. The corners of the windows may be cut off as illustrated to provide a space into which a sharp object such as a pin, knifeblade, etc., may be inserted to pry the window loose.

The bubble-type window is used for dry, teresteral and more bulky flies. Removable transparent window 58 may be flat, and is used where the flies are small, such as in the case of wet flies, nymphs, small streamers, bucktails, and the like.

The cover 42 carries a tab 65 which serves as a handle for clasping the cover to pivotally move it to the open position. The tab extends upwardly from the top surface of the cover and projects beyond the leading edge thereof. Openings 66 in peripheral walls 33, receive tab 65 and allow for complete closure.

Secure compartment cover closure is afforded by the snap device illustrated. At the base of front edge 45 is affixed a horizontal abutment 67. The space between the abutment and tab 65 defines a recession for receiving horizontal ridge wall 68. In closing the cover, abutment 67 and wall 68 come into contact, the abutment pressing against and sliding past ridge wall 68, the ridge snapping into place. The fly box may be so constructed that the depression is formed in the compartment wall into which an abutment on the cover is received. Closure may also be afforded with a closure device utilizing a male and female dimple.

Hinge pins 63 are oppositely mounted on the rear end of cover 42. The pins project perpendicularly from the cover sides and form an integral part of the rear semicircular wall 50. Spacing 64 receives bearing 70, allowing for rotative movement of the covers. Bearing 70 comprises pillar 71 having a square or rectangular cross section, the pillar extending from the bottom of the box to above the rim of the box wall. The top of the pillar has a circular channel 72 drilled therethrough, said channel having a 90° opening for receiving hinge pins 63, the opening having a diameter less than the diameter of the pins. The free end of the pillar defines a semicircle which is concentric with the circular channel and defines the bearing walls. As the bearing walls are flexible, they will spread apart upon application of a radially outward force in the direction of opening of the cover. The pins can then pass through the expanded opening. By a reverse process, the pins may be engaged by bearings.

The above-described fly box provides a convenient means for storing a supply of fishing fly hooks, lures and the like, which will be prevented from entanglement with one another and will be readily accessible by merely lifting the cover of the compartment. The partition walls in the cover prevent entanglement between the flies and lures no matter what position the fly box may assume, or no matter how much agitation it is subjected to. The compartments are sufficiently deep so that the fly hooks are not engaged by the cover 42.

It will be seen that by merely inspecting the covers 42, the types of fly hooks contained within the various compartments 38 will be readily identified by means of the duplicate fly 39 and name plate 40 encased in the recessed portion of cover 42. By raising the cover, the desired type of hook is readily available.

Figure 5:
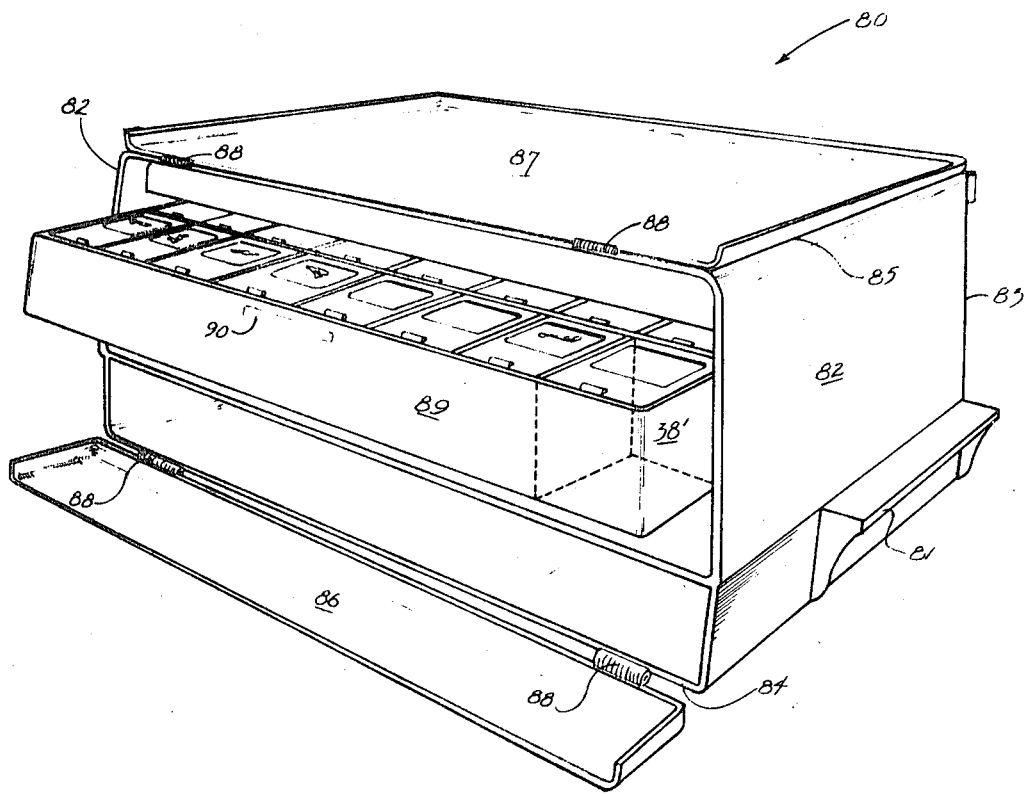
FIG. 5 is a perspective view of a storage box to be used in conjunction with the fly tackle fishing box.

With reference now to FIG. 5, an improved storage box 80 is illustrated for storing a supply of different types of named hooks and lures. The box shown has handles 81, sidewalls 82, rear wall 83, bottom and top walls 84 and 85, and front walls 86 and 87 mounted on hinges 88. The front walls open to allow access to drawers 89 which have affixed thereto handles 90, affording a convenient grip for opening the drawers. Compartments 38' receive and store the fly hooks 39. These compartments are sized to hingedly engage the covers 42 of fly tackle box 10.

In use, the compartments 38 in fly hook box 10 may be filled from the supply of fly hooks in the compartments of storage box 80. The covers 42 for compartments 38' of storage box 80 may be interchanged with those of fly box 10. The user, when he desires to change a fly hook, may readily observe the duplicate fly 39 of the type of fly hook in the particular compartment 38' of storage box 80 and select a fly he desires to next use. He may then lift the cover 42 of the compartment, lift the fly out of the compartment, and interchange the cover and the duplicate fly he desires to use with a cover and fly he does not desire to use presently in fly box 10. The fly box is carried by the user, and contains the particular flies that he will use at the time he is fishing. The user may carry one or more of these boxes which would be of a convenient size to fit into his fishing jacket pocket or pockets. When a particular fly is not to be used, the fly and the matching cover may be transferred to the companion fly storage box, and vice versa.

It should be appreciated, that fly tackle boxes having compartments of different size may be provided with covers suitably sized for said compartments. The covers, while of different size than shown in the drawings, will incorporate the same basic features.

Fishing tackle display boxes used in the selling of flies may be constructed using the features and embodiments of this invention. These display boxes are arranged to receive compartment covers as described above and are afforded the same advantages of ease and convenience.

Having thus described my invention, it will be apparent that other modifications may be practiced within the scope thereof, which is to be limited only by the following claims.

What I claim is:

1. In a fly fishing tackle box with a number of compartments having display covers for holding fly hooks of differing types therein and including means for identifying the contents of the interior of each of said compartments without opening said compartments, the improvement comprising: means associated with each of said compartment covers for removably containing a fly hook and indicia means therein to allow replacement of said contained fly and indicia means with those of a different type and for use of the encased fly if desired; and window means associated with said covers for visibly displaying said fly hook and indicia means, wherein said removable container means comprises a platelike openable compartment cover removably mounted on the sidewalls of said compartment at the tops thereof, said cover having a recessed top portion defining a shelf for supporting said indicia means thereon and having a well extending downwardly from said recessed top portion for receiving a fly hook and said window means comprises a removable transparent window sized to fit into the recessed portion of said cover to contain said indicia means and fly hook therewithin.

2. Apparatus according to claim 1 including means for securing said covers in a closed position comprising a recessed portion formed on the leading edge of said compartment cover; and an abutment on the fly box wall located to engage said recessed portion.

3. Apparatus according to claim 2 wherein the platelike openable covers are plastic.

4. Apparatus according to claim 2 including means for hingedly mounting said compartment covers comprising a pair of oppositely hinged pins projecting perpendicularly from the compartment cover sides; and bearings adjacent the compartment walls sized and positioned to engage the pins, said bearings having a circular channel for receiving said pins and having an opening narrower than the diameter of the pins and flexible bearing walls.

* * * * *